R. SYLVESTER.
TRACTION THRESHING APPARATUS.
APPLICATION FILED APR. 22, 1914.
1,185,957.
Patented June 6, 1916.
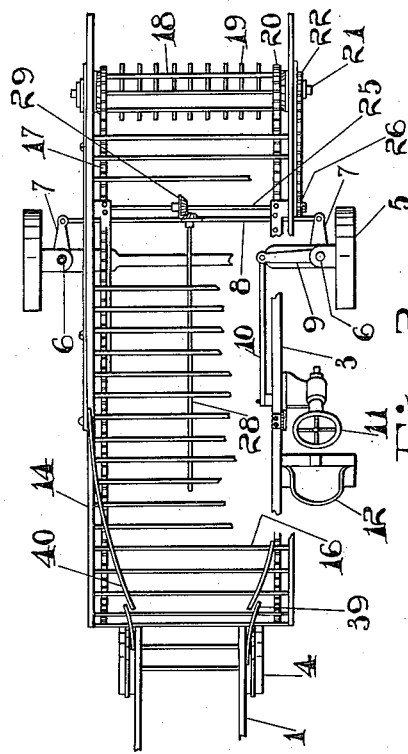
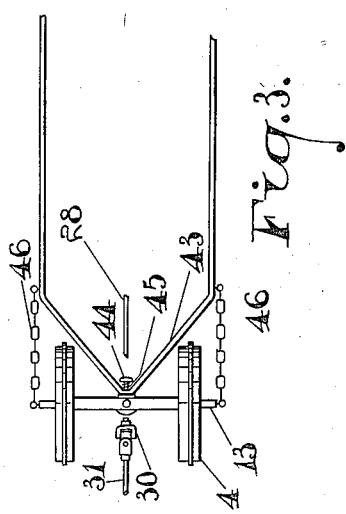
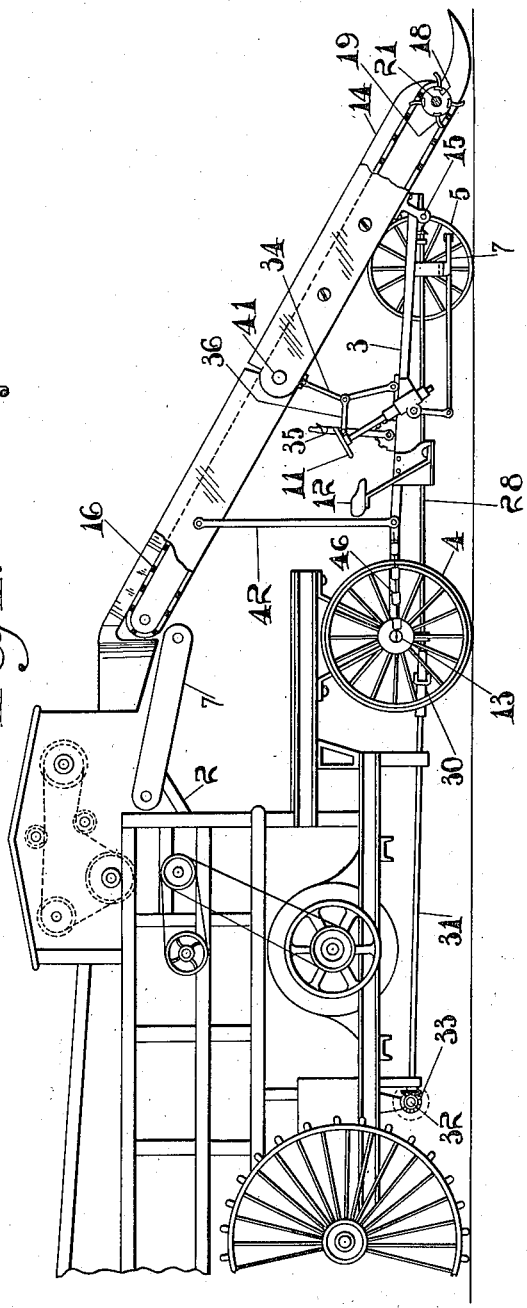
WITNESSES.
N. R. Tyndall.
E. P. Habl.
INVENTOR.
R. Sylvester.
BY J. Edward Maybee.
ATTY.

UNITED STATES PATENT OFFICE.

RICHARD SYLVESTER, OF LINDSAY, ONTARIO, CANADA.

TRACTION THRESHING APPARATUS.

1,185,957.  Specification of Letters Patent.  Patented June 6, 1916.

Application filed April 22, 1914.  Serial No. 833,821.

*To all whom it may concern:*

Be it known that I, RICHARD SYLVESTER, of the town of Lindsay, in the Province of Ontario, Canada, have invented certain new and useful Improvements in Traction Threshing Apparatus, of which the following is a specification.

This invention relates particularly to threshing machines which are adapted for self propulsion so that they may be moved through a field, and adapted also to pick up sheaves or loose grain as they travel. In devising such apparatus several problems present themselves for solution.

For effective work the pick-up mechanism must be placed at the front of the apparatus and yet the apparatus must be steered from the front: to keep down the number of operators required the pick-up mechanism should deliver the sheaves or loose grain direct to the feeding mechanism of the thresher and must do this effectively without being affected by the steering movements or by any irregularities in the ground: to insure the pick-up mechanism always operating effectively it is necessary to adjust its forward end vertically and this must be done without materially affecting the relationship of the rearward end to the feeding mechanism of the thresher.

I have solved the problems referred to by constructing the apparatus substantially as described and illustrated in the accompanying drawings in which—

Figure 1 is a side elevation partly broken away showing part of a threshing machine with sheaf pick-up mechanism attached; Fig. 2 is a plan view partly broken away of the pick-up mechanism; and Fig. 3 is a plan view of the connection of the frame of the pick-up mechanism with its rear axle.

In the drawings like numerals of reference indicate corresponding parts in the different figures.

In Fig. 1, part of the threshing machine is shown in outline, but as the details of this machine form no part of the present invention, only such portions as are specially concerned with the present invention will be specifically referred to.

The machine will be of the type provided with automatic feeding apparatus, and 1 represents the conveyer of this feeding apparatus which leads to a point adjacent the cylinder of the machine, 2 being a chute leading into the machine at a suitable angle and in a suitable position to feed the unthreshed straw to the cylinder of the machine.

To the thresher is connected a pick-up mechanism which is arranged and connected in the manner I will now describe.

3 is the main frame of the pick-up mechanism. This carries the ground wheel 4 at its rear end in the manner hereinafter described. The forward ground wheels 5 are arranged as steering wheels, the wheels being arranged to be swung in the manner common in automobile construction. The axle 6 of each of these steering wheels is vertically pivoted on the frame of the machine and has an arm 7 secured thereto. These arms are pivotally connected with the opposite ends of the connecting rod 8. To one of the axles 6 is secured the arm 9 connected by means of the connecting rod 10 with the steering wheel 11 which actuates the connecting rod 10 in the manner common in automobile construction. Behind the steering wheel is located the seat 12 from which the man in charge controls the steering of the apparatus. The main frame of the pick-up mechanism is pivotally connected at its rear end with the forward end of the threshing machine so as to steer the latter. The rear axle 13 which does not swing in a horizontal plane relative to the pick-up mechanism and with which pivotal connection may be made in an ordinary manner by means of a vertical king bolt, so that said axle swings relative to the threshing machine.

The frame 3 is connected with the rear axle 13 carrying the wheels 4 in the following manner. The rear members 43 of the frame 3 are inclined inwardly so as to join at the central longitudinal plane of the apparatus. A horizontal pivot bolt 44 longitudinally arranged connects them with the axle 13. The pivot must be loosely arranged so as to permit the frame 3 to swing up and down on the connection as well as to rock transversely. Preferably I arrange a coil spring 45 on the pivot bolt which engages the head on the bolt and the forward side of the connection between the members 43. This spring keeps the joint tight but permits of any yielding which may be necessary. The axle is kept in proper alinement with the frame by means of the chains or cables 46 connecting the sides of the frame with the ends of the axle. The connection described allows the forward part of the frame 3 to rise or fall relative to the axle 13 or to rock transversely so that the supporting wheels of the frame are always in contact with the ground notwithstanding any inequalities thereof.

At the forward end of the main frame 3 is located the mechanism for picking up and elevating the sheaves or loose grain. This comprises the elevator frame 14 which is pivoted at 15 at the forward end of the main frame 3. This elevator frame carries the endless conveyer 16, which may be of any ordinary type and which is provided at one end with a spindle 21 adapted to be driven by the sprocket wheel 22 secured thereto. At the front of the conveyer are located the rotating pick-up rakes 18 which lift the sheaves or loose grain on the elevator. Each of these consists of a cross-bar provided with a series of teeth 19 preferably curved as shown. The rakes 18 are secured to and carried by the sprocket wheels 20 secured to the shaft 21 and on which run the chains 17 of the conveyer.

Any type of pick-up rakes may be employed, and I therefore show them in the simplest possible arrangement.

The conveyer and the rakes are driven from the shaft 25, which is necessarily coaxial with the pivots on which the conveyer frame rocks and indeed practically forms the pivots for the same. One end of this shaft is provided with a sprocket wheel 26, driving by a suitable sprocket chain the sprocket wheel 22. It will be understood of course, that many variations of the drive for the rakes and elevator may be devised and I do not desire to restrict myself to the specific construction shown.

In practice the threshing machine will be self-propelled, and it is necessary, therefore, to provide means for driving the pick-up mechanism by suitable connections with some moving part of the threshing machine. For this purpose I journal beneath the main frame 3 of the pick-up mechanism the shaft 28 which by means of suitable bevel gearing 29 drives the shaft 25. This shaft will have a suitable flexible connection 30 with the shaft 31 beneath the threshing machine, which may be actuated in any suitable manner, but for convenience of illustration this is shown as by the cross shaft 32 by means of the bevel gearing 33. This shaft 32 may be either engine driven or driven from the ground wheels of the thresher, but as this forms no part of the present invention such connections are neither illustrated nor described.

The exact arrangement of the driving gearing of the thresher is immaterial and other mechanism might be substituted for the shaft 31. The main point to be observed is that there must be a flexible connection with the shaft 28 or other driving gearing of the pick-up mechanism, so that the movements of the latter will not affect the drive.

It is necessary to provide means for adjusting the pick-up mechanism to bring the rakes 18 in proper relationship to the ground. For this purpose I provide the toggle levers 34 pivotally connected with the main frame 3 and the elevator frame 14. These toggle levers may be operated through the medium of the hand lever 35 of ordinary type connected with the central joint of one of the toggles by means of the link 36, as shown. This lever 35 is preferably in a position convenient to the operator on the seat 12.

It will be noted that the rear end of the conveyer 16 extends rearwardly substantially to a plane in which lies the axis of the axle of the wheels 4 and just above the forward end of the feed conveyer 1. Thus, as the pick-up mechanism is swung to one side or the other in steering the apparatus, the relative position of the adjacent ends of the elevator and conveyer are little, if any, disturbed. As the elevator is somewhat wider than the conveyer, it is necessary to provide means for guiding the sheaves from one to the other. I therefore provide the flexible wings 39 secured to the frame of the conveyer 1 and the flexible wings 40 secured to the frame of the elevator 14, which overlap one another as shown, the wings 40 lying inside the wings 39 as is necessary owing to the direction of travel of the sheaves. These wings yield as much as may be necessary as the elevator is swung to one side or the other and always properly guide the sheaves to the conveyer 1.

As the front end of the elevator 14 is raised and lowered according to conditions by varying the angle of its frame to the ground, it is necessary to provide means for preventing the vertical position of its rear end relative to the conveyer 1 varying to any marked degree. I therefore form the elevator in two parts hinged together at 41, so that the rear end may be supported without thus preventing the adjustment of its forward part. The upper part of the elevator is preferably supported from the frame 3 by means of the pivoted links 42. From this construction it follows that the position of the rear end of the rearward part of the elevator is not materially affected by the adjustment of the forward part, the movement of the forward part itself being never at any time very great. The operation of this device involves the sheaves being placed in the field so that the sheaves are elevated at regular intervals. The operator on the seat 12 steers the apparatus from sheaf to sheaf or windrows of loose grain. These sheaves are picked up and conveyed back directly to the conveyer 1, and a continuous feed to the thresher is thus obtained.

From the above description it will be readily seen that I have devised a construction which will satisfactorily accomplish the objects of my invention as set out in the preamble to this specification.

What I claim as my invention is:

1. The combination of a wheeled receiving apparatus; a steering axle pivoted thereon to swing horizontally; wheels journaled on the axle; a frame for pick-up mechanism; a connection between the frame and the center of the axle whereby the frame may rock transversely of the axle and also swing vertically thereon; flexible connections between the sides of the frame and the ends of said axle adapted to maintain the frame in substantial alinement with the axle and its wheels; steering ground wheels for the said frame; and means on said frame for swinging said steering wheels.

2. The combination of a wheeled receiving apparatus; a steering axle pivoted thereon to swing horizontally; wheels journaled on the axle; a rigid frame for pick-up mechanism extending rearwardly to said steering axle and having connections therewith whereby it may swing the axle and also rock transversely and swing vertically from a point at the center of the axle; and steering wheels for the aforesaid frame.

3. The combination of a wheeled receiving apparatus; a steering axle pivoted thereon to swing horizontally; wheels journaled on the axle; a rigid frame for pick-up mechanism extending rearwardly to said steering axle and having connections therewith whereby it may swing the axle and also rock transversely and swing vertically from a point at the center of the axle; steering wheels for the aforesaid frame; a feed conveyer on the receiving apparatus; and pick-up mechanism carried by the frame aforesaid including an elevator, said elevator extending rearwardly substantially to a vertical plane in which lies the axle of the steering wheels of the receiving apparatus and just above the forward end of the feed conveyer.

4. The combination of a wheeled receiving apparatus; ground wheels for steering the same; a feed conveyer thereon; pick-up mechanism including an elevator; connections between the said frame and the ground to swing the latter for steering purposes, said elevator extending rearwardly substantially to a vertical plane in which lies the axis of the front wheels of the receiving apparatus and just above the forward end of the feed conveyer, and flexible overlapping wings on the frames of said elevator and conveyer to guide sheaves from the one to the other.

5. The combination of a wheeled receiving apparatus; a steering axle pivoted thereon to swing horizontally; wheels journaled on the axle; a rigid frame for pick-up mechanism extending rearwardly to said steering axle and having connections therewith whereby it may swing the axle and also rock transversely and swing vertically from a point at the center of the axle; steering wheels for the aforesaid frame; a feed conveyer on the receiving apparatus; and pick-up mechanism carried by the frame aforesaid including an elevator, said elevator extending rearwardly substantially to a vertical plane in which lies the axle of the steering wheels of the receiving apparatus and just above the forward end of the feed conveyer, the said conveyer also being formed in two parts hinged together, the forward part being pivoted intermediate its ends on the frame of the pick-up mechanism; means for adjusting the angle of the forward part of said elevator to the ground and means for supporting the rearward part of the elevator from the said frame so as to permit of said adjustment.

6. The combination of a wheeled receiving apparatus; ground wheels for steering the same; a feed conveyer thereon; pick-up mechanism including an elevator; connections between the said frame and the ground to swing the latter for steering purposes, said elevator extending rearwardly substantially to a vertical plane in which lies the axis of the steering wheels of the receiving apparatus and just above the forward end of the feed conveyer, the said conveyer also being formed in two parts hinged together, the forward part being pivoted intermediate its ends on the frame of the pick-up mechanism; means for adjusting the angle of the forward part of said elevator to the ground; and means for supporting the rearward part of the elevator from the said frame so as to permit of said adjustment, said means comprising a pair of pivoted links.

Lindsay, Ont., this thirteenth day of April, A. D. 1914.

RICHARD SYLVESTER.

Signed in the presence of—
L. V. O'CONNOR,
NORA O'REILLY.